(12) United States Patent
Eldar

(10) Patent No.: US 11,245,672 B2
(45) Date of Patent: Feb. 8, 2022

(54) SYSTEM AND METHOD TO ACCESS CONTENT OF ENCRYPTED DATA ITEMS IN UNSUPPORTED DIGITAL ENVIRONMENTS

(71) Applicant: MICROSOFT ISRAEL RESEARCH AND DEVELOPMENT (2002) LTD, Matam Haifa (IL)

(72) Inventor: Yuval Eldar, Shoham (IL)

(73) Assignee: MICROSOFT TECHNOLOGLY LICENSING, LLC, Redmond, WA (US)

( * ) Notice: Subject to any disclaimer, the term of this patent is extended or adjusted under 35 U.S.C. 154(b) by 12 days.

(21) Appl. No.: 14/389,527

(22) PCT Filed: Jun. 17, 2013

(86) PCT No.: PCT/IL2013/050518
§ 371 (c)(1),
(2) Date: Sep. 30, 2014

(87) PCT Pub. No.: WO2013/190549
PCT Pub. Date: Dec. 27, 2013

(65) Prior Publication Data
US 2015/0095645 A1    Apr. 2, 2015

Related U.S. Application Data

(60) Provisional application No. 61/660,835, filed on Jun. 18, 2012.

(51) Int. Cl.
*H04L 29/06* (2006.01)
*G06F 21/62* (2013.01)
*H04W 12/02* (2009.01)
*H04L 12/58* (2006.01)
*H04W 12/37* (2021.01)

(52) U.S. Cl.
CPC ...... *H04L 63/0428* (2013.01); *G06F 21/6209* (2013.01); *H04L 51/18* (2013.01);
(Continued)

(58) Field of Classification Search
CPC ..... H04L 63/20; H04L 63/0428; H04L 51/18; H04L 63/0281; H04L 63/0485;
(Continued)

(56) References Cited

U.S. PATENT DOCUMENTS 6,182,141 B1    1/2001  Lum et al.
6,360,254 B1    3/2002  Linden et al.
(Continued)

FOREIGN PATENT DOCUMENTS

WO    WO 2011097669 A1    8/2011

OTHER PUBLICATIONS

Communication and Supplementary European Search Report from a counterpart foreign application—EP 13 80 6845—8 pages, dated Jan. 15, 2016.
(Continued)

*Primary Examiner* — Linglan E Edwards
*Assistant Examiner* — Forrest L Carey
(74) *Attorney, Agent, or Firm* — Workman Nydegger

(57) ABSTRACT

A method for accessing content of encrypted data item(s) by a terminal device operating in a digital environment, according to which before the data item is being accessed by the terminal device, it is modified after being intercepted if found to be encrypted. The wrapper of the data item is modified or replaced by embedding a URL with a unique identifier and a message into the wrapper of the data item. If a supported terminal device attempts to accesses the modified data item, the client application natively consumes the data from the modified data item and ignores its wrapper. If not, the message and the URL are displayed on the terminal device and the user browses the URL. Then after authentication, a web server locates the modified data item using the unique identifier, retrieves and decrypts the modified item and converts the decrypted modified data item to
(Continued)

a format that can be consumed by the browser. Then, if the user has permission, he can view the data item by rendering it to the browser in his terminal device.

22 Claims, 3 Drawing Sheets

(52) U.S. Cl.
CPC ...... *H04L 63/0281* (2013.01); *H04L 63/0485* (2013.01); *H04L 63/08* (2013.01); *H04L 63/20* (2013.01); *H04W 12/02* (2013.01); *H04W 12/37* (2021.01); *H04L 63/10* (2013.01); *H04L 2209/76* (2013.01)

(58) Field of Classification Search
CPC ..... H04L 63/08; H04L 63/10; H04L 2209/76; G06F 21/6209; H04W 12/02; H04W 12/37
USPC ........................................................ 713/168
See application file for complete search history.

(56) References Cited

U.S. PATENT DOCUMENTS

| | | | |
|---|---|---|---|
| 7,921,292 B1* | 4/2011 | Pauker | H04L 9/083 713/171 |
| 2004/0025057 A1* | 2/2004 | Cook | G06Q 10/107 726/28 |
| 2004/0039827 A1 | 2/2004 | Thomas et al. | |
| 2005/0071632 A1* | 3/2005 | Pauker | H04L 63/0442 713/165 |
| 2006/0184632 A1 | 8/2006 | Marino et al. | |
| 2010/0017417 A1* | 1/2010 | Ronning | H04L 67/06 707/E17.01 |
| 2010/0037050 A1 | 2/2010 | Karul | |
| 2011/0078260 A1* | 3/2011 | Rashad | G06Q 10/107 709/206 |
| 2013/0114810 A1* | 5/2013 | Kobayashi | H04L 9/3073 380/47 |
| 2013/0227287 A1 | 8/2013 | Quinlan et al. | |

OTHER PUBLICATIONS

International Search Report and Written Opinion Issued in PCT Application No. PCT/IL2013/050518, dated Sep. 29, 2013.
"Office Action Issued in Israel Patent Application No. 236361", dated May 4, 2017, 3 Pages.
Israeli Office Action cited in Israeli Application No. 66368, dated Sep. 19, 2017.
"Office Action Issued in Israel Patent Application No. 236361", dated Feb. 18, 2018, 5 Pages.

* cited by examiner

SYSTEM AND METHOD TO ACCESS CONTENT OF ENCRYPTED DATA ITEMS IN UNSUPPORTED DIGITAL ENVIRONMENTS

FIELD OF THE INVENTION

The present invention relates to the field of security services for data networks. More particularly, the invention relates to a method of securely accessing the content of encrypted data items, such as emails and documents, in unsupported digital environments, such as of mobile devices.

BACKGROUND OF THE INVENTION

Emails and documents that are accessed by a data network are widely used as the basis of communication by knowledge workers. When sensitive emails are concerned, users commonly encrypt them in order to apply usage and access rights even when those items are not in their physical control. Usually, users and organizations use standard encryption and Information Rights Management (IRM) or Enterprise Digital Rights Management (E-DRM) tools such Microsoft AD RMS (Active Directory Rights Management Services AD-RMS is an information protection technology that works with AD RMS-enabled applications to help safeguard digital information from unauthorized use. Content owners can define who can open, modify, print, forward, or take other actions with the information), S/MIME (Secure Multi-Purpose Internet Mail Extensions is a secure method of sending e-mail that uses the Rivest-Shamir-Adleman encryption system), and others. Encryption is indeed an excellent mechanism to protect against unauthorized usage/access. However, when using encryption, the recipient of the data items must have an encryption enabled application that is able to decrypt the data. In addition, if the data item (such as email or document) uses IRM technology, the application should apply applicative usage rights such as copy/paste, print, do not forward, edit, expiration, and others, in order to support IRM technology. Therefore, the device and application should be able to support those tools in order to validate the user, retrieve the relevant decryption keys from the key manager, decrypt the content, validate security policy and apply the usage/applicative rights within the consuming application such as email clients, editors, and viewers. In conventional existing environment, where there is diversity of devices, operating systems, and applications, this prerequisite can be very challenging, especially when mobile devices are involved. Even if there is support for those devices, the data management overhead can be very expensive and time consuming. One of the main reasons is the strategy of many organizations of Bring Your Own Device (BYOD) and Consumerization of IT where the devices are no longer in the hold of the organization, allowing employees to use their own devices. In that situation, therefore, it can be very challenging to deploy enterprise's encryption enabled applications and/or distrusting keys and certificates to those devices. Those reasons are holding back the proliferation of encryption and IRM technologies.

In many organizations the amount of data items that should be encrypted is relatively low (few percent). However, there are several organizations, such as banks, in which amount is much larger, where sometime up to 80% of the data items sent to users must be encrypted. Therefore, in mobile environments, such a high level of encryption cannot be efficiently processed.

Several attempts were made to develop client applications for mobile devices, which are able to receive encrypted data items and open it. However, these client applications can be developed only if these mobile devices operate in a supported environment and if the environment is not supported, these client applications cannot process data items that were encrypted in an unsupported way. For example, MS Outlook has a client application that support data items encoded according to S/MIME protocol, such as attachments. In this case, this client application is able to get the data item, process it and render it in its native forms. However, if the same data item will be encoded according to other protocols which are not supported by MS Outlook, this client application will not be able to render the data item.

Another existing solution proposes using an encryption gateway which encodes the data items for the user and sends it to the recipient or sends only a URL to the recipient, who uses it to get into a repository and retrieves the data item. However, this solution is also problematic, since it automatically converts all the data items of all users into a web format, regardless the fact that some of the users do work with a supported environment and have an appropriate client application which can render the data item in its native form.

Another drawback of this existing solution is that since all the data item are converted, the user will have access to all of his data items only via web rendering that has appearance and properties, which are different from the native properties he is used to. In some cases, such as email, some properties (such as an attachment file which can be copied or saved on the fly if rendered in in its native form) will be missing from the data items due to the conversion into web rendering format. This of course is less convenient for the users.

In addition, accessing all data items after conversion to web rendering format is slower than native rendering and requires additional mass storage resources.

It is therefore an object of the present invention to provide a method for accessing the content of encrypted data items, in unsupported digital environments.

It is another object of the present invention to provide a method for accessing the content of encrypted data items, while rendering most of them in their native form.

It is a further object of the present invention to provide a method for accessing the content of encrypted data items, which will be convenient for the users.

It is still another object of the present invention to provide a method for accessing the content of encrypted data items, which is sufficiently fast and does not require additional mass storage resources.

Other objects and advantages of the invention will become apparent as the description proceeds.

SUMMARY OF THE INVENTION

Generally, the invention allows devices (such as mobile, non-supported application and Operating Systems) to access in a simple and secure way data items such as emails and documents in environments that cannot deploy encryption enabled applications whether they are not supported in those environments or there is no control on those devices and therefore cannot be managed.

In one aspect, the present invention is directed to a method for accessing content of encrypted data item(s) by a terminal device (such as a mobile communication device, a tablet or a smartphone) operating in a digital environment, comprising the steps of:

a) before the data item is being accessed by the terminal device,
   a.1) intercepting the data item;
   a.2) determining whether the data item, is encrypted;
   a.3) if found to be encrypted, modifying or replacing the wrapper of the data item by embedding a URL having a unique identifier and a message into the wrapper of the data item;
b) in response to an attempt to accesses the modified data item,
   b.1) if the digital environment is supported, allowing the client application that natively consumes the data from the modified data item while ignoring its wrapper;
   b.2) if the digital environment is unsupported, displaying the message and the URL on the terminal device;
c) in response to browsing the URL by a browser or a web application client, on the terminal device:
   c.1) authenticating the credentials of the user of the terminal device;
   c.2) locating, by a web server, the modified data item using the credentials and the unique identifier;
   c.3) retrieving and decrypting the modified item;
d) converting the decrypted modified data item to a format, capable being consumed by the browser or the web application client; and
e) if the user has a permission, allowing the user to at least view the data item by rendering it to the browser or to the web application client in the terminal device.

The data item may be intercepted by a server or by a component that is integrated within an application. A plurality of data items may be intercepted at different locations and during different time spans, which include:
   the moment of creation of an encrypted data item;
   the moment of transmitting the encrypted data item;
   when the encrypted data item is stored.

An intercepted data item may be determined to be encrypted when its extension is one of predetermined extensions, when it has a predetermined structure or when its content is found to contain unique strings that are indicative of encrypted content.

A component for interception and modification of the data item may be integrated with the application that is responsible to the creation or the delivery or storage of the data item.

The component may be a proxy between the application that sends the item to the server and the server managing the item.

The modification process may be triggered by a batch process that scans data items located at different locations during predetermined intervals, in order to identify encrypted data items or by a predetermined event in a running application, in order to identify encrypted data items.

The unique identifier may be injected into an indexable property (such as an email header) of the clear text section of the modified wrapper, to be used by a repository for retrieving the modified data item.

The content of the modified data item may be accessed after a user clicks on the URL link.

Rendering of the data item to the terminal device may be done by accessing a renderer component (e.g., a renderer server).

The renderer component may perform one or more of the following actions selected from the group of analyzing a user agent, authenticating the user, obtain an identifier associated with the modified data item, retrieving the modified data item, decrypting the modified data item, converting the modified data item to a standard rendering format, adjusting the rendering format to a screen requestor, hardening functionalities of the modified data item, and responding to the requestor.

A global unique identifier may be transmitted to a central database and the modified data item is copied to a dedicated storage server.

The present invention is also directed to a system for accessing content of encrypted data items in an unsupported digital environment, which comprises:
   a) a plurality of terminal devices being in a digital environment and operable to receive and transmit data items over a data network, each of the terminal devices having a browser or a web application client;
   b) a software module(s) for performing the following steps, before the data item is being accessed by the terminal device:
      a.1) intercepting the data item;
      a.2) determining whether the data item, is encrypted;
      a.3) if found to be encrypted, modifying or replacing the wrapper of the data item by embedding a URL having a unique identifier and a message into the wrapper of the data item;
   b) a software module(s) for performing the following steps, in response to an attempt to accesses the modified data item:
      b.1) if the digital environment is supported, allowing the client application that natively consumes the data from the modified data item while ignoring its wrapper;
      b.2) if the digital environment is unsupported, displaying the message and the URL on the terminal device;
   c) a software module(s) for performing the following steps, in response to browsing the URL by:
      c.1) authenticating the credentials of the user of the terminal device;
      c.2) locating, by a web server, the modified data item using the credentials and the unique identifier;
      c.3) retrieving and decrypting the modified item;
   d) converting the decrypted modified data item to a format, capable being consumed by the browser or the web application client; and
   e) a renderer server for allowing the user if he has a permission, to at least view the data item by rendering it to the browser or to the web application client in the terminal device.

DETAILED DESCRIPTION OF PREFERRED EMBODIMENTS

A detailed description of one or more embodiments of the invention is provided below along with accompanying figures that illustrate the principles of the invention. While the invention is described in conjunction with such embodiments it should be understood that the invention is not limited to any one embodiment. To the contrary, the scope of the invention is limited only by the claims and the invention encompasses numerous alternatives modifications and equivalents. For the purpose of example numerous specific details are set forth in the following description in order to provide a thorough understanding of the present invention. These details are provided for the purpose of example and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways including as a process, an apparatus, a system, a device, a method, or a computer network wherein program instructions are sent over optical, wireless, or electronic communication links. A general purpose computer or mobile system running on Microsoft Windows, iOS (a mobile operating system developed and distributed by Apple Inc.), Android (a Linux-based operating system designed for touchscreen mobile devices such as smartphones and tablet computers), Blackberry OS, MacOS (a graphical user interface-based operating system developed by Apple Inc. for Macintosh line of computer systems), Linux, or any other suitable operating system may be used, or a specialized appliance may be implemented in any other form. In general, the order of the steps of the disclosed method may be altered and be within the scope of the invention.

Figure 1:
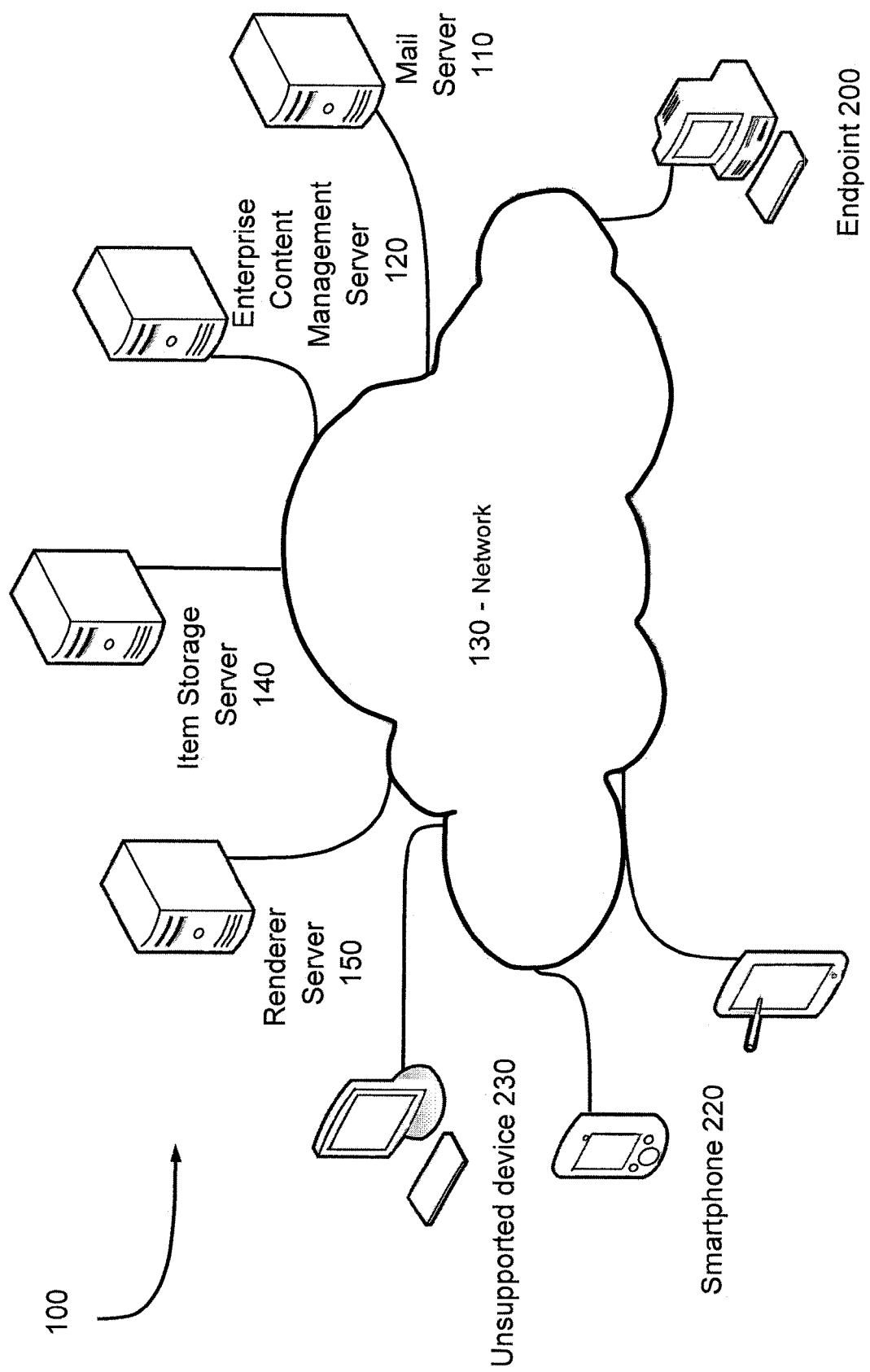
FIG. 1 is a diagram of the components of the system, proposed by the present invention.

FIG. 1 is a schematic illustration of a system 100 for accessing content within encrypted data items such as emails and documents in unsupported environments. In an exemplary embodiment of the invention, system 100 can be implemented as a public cloud service (for distributed computing over a data network with the ability to run a program on many connected computers at the same time) or a private cloud within the enterprise. System 100 may be implemented as a hybrid model when some of the system components may be implemented within the enterprise and others may be implemented as a Public Cloud (a set of computers and computer network resources based on the standard cloud computing model, in which a service provider makes resources, such as applications and storage, available to the general public over the Internet) outside the enterprise. The organization may be a small office with a few devices, such as endpoints 200, smartphones 220, tablets 210, and unsupported devices 230 or applications that do not support encryption engines. Alternatively, the enterprise may be associated with multiple physical locations that are connected together by a network 130 having hundreds of thousands of devices. Some devices may be connected together by a Local Area Network (LAN) or other types of networks and are controlled by the organization, while some devices may be connected together by a Wide Area Network (WAN) and are not controlled by the organization.

Figure 2:
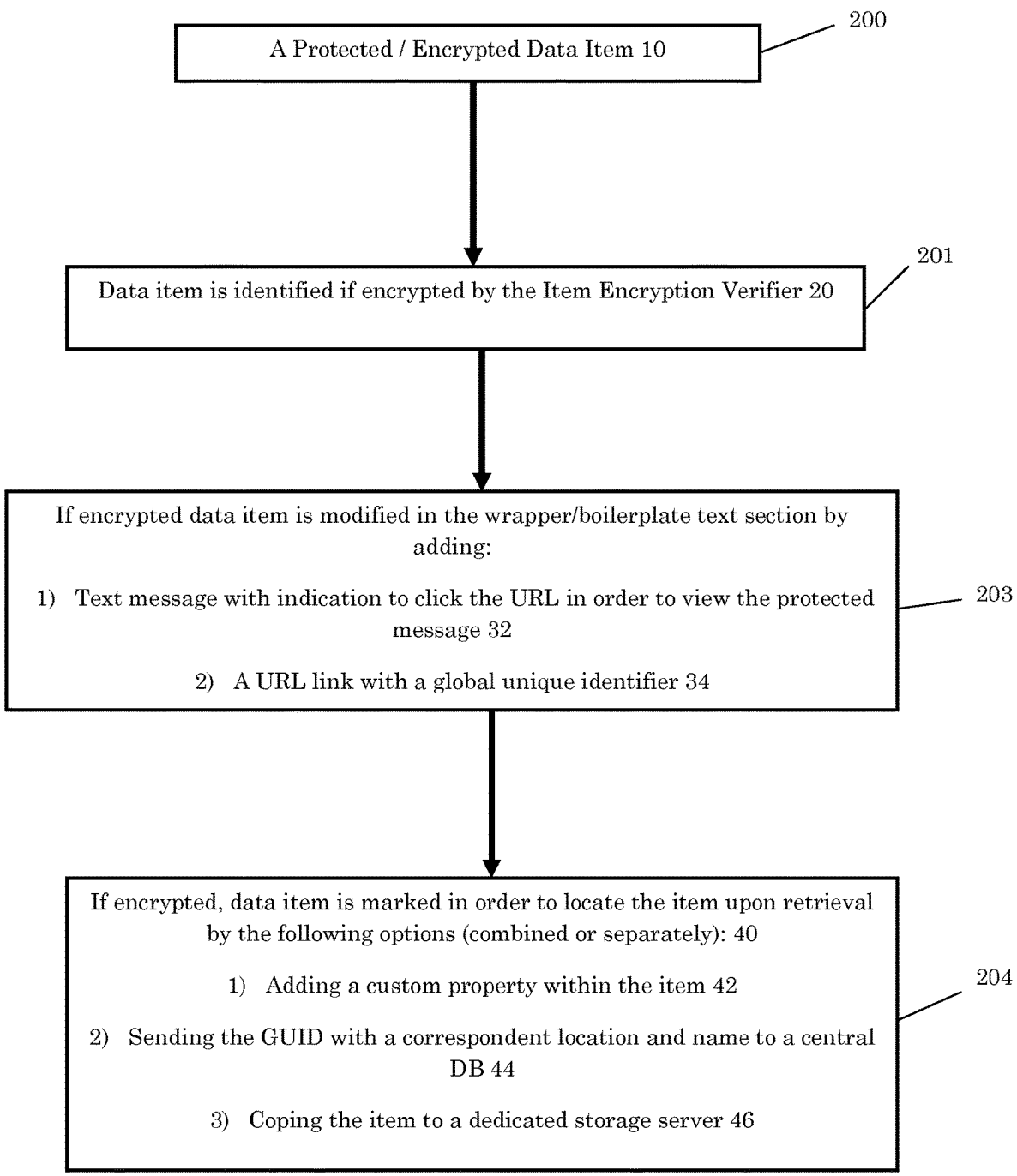
FIG. 2 is a flowchart illustrating applying identification and modification of encrypted items, according to the method proposed by the present invention.

Following protection/encryption of a data item, such as an email item, attachment, or a document/file, the data item undergoes an identification and modification process (as shown in FIG. 2), which may take place at different locations and during different time spans. Alternatively, the transmission of a data item through an email infrastructure (such as MS Exchange at a server level 110 or MS Outlook at the endpoint level 200), or the uploading of a data item to collaboration infrastructure 120 such as enterprise content management, e.g. MS SharePoint, (a platform for sharing information resources for managing them by several connected users) or to document sharing services such as Dropbox (a cloud-based service that allows users to store files and share them with other users and their associated computers), may trigger the application of an identification and modification process on the data item. Alternatively, a batch process may scan data items located at various locations during predetermined intervals in order to identify encrypted items.

The method, illustrated as a flowchart in FIG. 2, is carried out by an Item Encryption Verifier 20, to verify whether the data item should be handled. The verifier 20 can identify whether the data item is encrypted by one of the following methods:

1) Usually an encrypted data item has a unique extension. For example, an email protected by S/MIME is built up with an email message including an encrypted attachment with a *.p7m extension. Another example is AD RMS email which includes an *.rpmsg extension.

2) Analysis of the structure of the data item. For example, an MS Office file that is protected by AD RMS is constructed by a Compound file (a file format for storing several files and streams within a single file) with dedicated AD RMS streams. Through the identification of those streams, it is possible to identify whether this is an AD RMS protected file.

3) Analysis of the content of the data item—by content inspection to find unique strings that identify encryption. For example, AD RMS protected documents contain a header based on XML (Extensible Markup Language) with elements such as "xml version="1.0"?><XrML version="1.2" xmlns.""><BODY type="Microsoft Rights Label" version="3.0">"

These various options can be combined or a single method can be used.

At the first step 200, a protected/encrypted data item 10 is sent. If at step 201 the data item 10 is identified by the Item Encryption Identifier 20 as being encrypted, at the next step 203 the data item 10 is passed to a modification process. Ordinarily, an encrypted data item is built up with two main parts: the encrypted section and a wrapper clear text section. The encrypted section contains the content item in an encrypted form. The wrapper (i.e., the data that is put in front of or around a transmission that provides information about it and may also encapsulate it from view to anyone other than the intended recipient) usually contains a text message in order to supply to the end user a notification message what he/she should do in order to view the content of the item. It is shown mainly when the application that tries to access the content does not support the encryption engine. This is done in order to assure that the end user will know what he/she needs to do.

Without using this technique, the user would have seen the encrypted content as a meaningless collection of characters (known as "gibberish"). As an example, AD RMS shows what is called as a boilerplate text that contains a message to notify the user to open the item in MS Office 2003 or a more advanced version. It is used for both email and documents. For emails, the boilerplate text (text sections that have to be included in many places) is inserted in the "wrapper" email where the encrypted email is placed as an attachment with the extension of *.rpmsg. When opening the email or document in applications other than Office 2003 and above which is not AD RMS enabled, this unsupported application will show the boilerplate text message. S/MIME operates in the same manner as AD RMS and also contains the encrypted item as an attachment within an email item that may contain a text message visible to all email clients. Alternatively, it may be that the system will add a dedicated wrapper. For example, for an encrypted email item, a clear text mail item wrapper will be constructed and the encrypted item will be attached to it. The same may be implemented for documents such as *.PDF or others.

The "wrapper" or boilerplate text is used to inject at this section of the item a URL link 34 with a corresponding text 32 pointing out to the user: "This is secure, encrypted item; to view this message click on the following link". The message can be customized and branded to support multilingual cases or company branding. The URL link 34 is built up by a pre-configured website part and with a Global Unique Identifier (GUID). This will used by the recipients to access through the Web in order to access the content of the item. In addition, at step 204 the Modifier 30 injects the GUID 42 into the clear text wrapper of the data item 10. The GUID 42 may be injected to a property that in latter stages can be used to locate the item. Usually, the property that will be used will be one that can be easily indexed. In email, the property may be in an email header. Alternatively, it can use Messaging Application Programming Interface (MAPI) property that is easily can be indexed and found within MS Exchange infrastructure. In the document, a property also may be used; for example, in Office format a custom property may be created. Alternatively, the Modifier 30 can use a central DB 44 (in the form of a Relational Database Management System-RDBMS, which is a database management system that is based on the relational model, or other form of a central DB) detached from the data item in order to have a Lookup table to locate the item. For example, the DB may contain a table with three fields—GUID column, location, and item name. Alternatively, at step 46, the item can be copied to a special item storage server 140 (shown in FIG. 1), which is dedicated for the item accessing processes.

The Item Encryption Verifier 20 and Modifier 30 can be placed at the point of item creation. For example, when an email is sent, these components can be placed within the application that is responsible to the delivery of the email. The component for interception and modification of the data item may be integrated with the application that is responsible to the creation or the delivery or storage of the data item. For example, the components can be integrated within MS Outlook through an add-in technology. Alternatively, a proxy between the application that sending the item to the server and the server managing the item (like email server 110, ECM 120, or other server side application) may be used to intercept the item. The data item may be intercepted at the moment of its creation or when it is scanned, or when it is sent.

Alternatively, these components can be deployed within the server side application. For example, within the email infrastructure 110 like MS Exchange; this MS Exchange Server in 2010 edition contains Hub Transport server role which handles all emails' flow. This module contains an infrastructure of third party transport agents which may inspect and modify the email items and their corresponding attachments. The Item Encryption Verifier 20 and Modifier 30 components can be integrated, based on the technology that the transport agent represents. Alternatively, the Item Encryption Verifier 20 and Modifier 30 can be deployed in special middleware servers, like a Blackberry Enterprise Server from RIM (Research In Motion Limited, Canada) or from Good Technology (Sunnyvale, Calif., U.S.A.), and others.

The software and service connects to messaging and collaboration software (Microsoft Exchange, Lotus Domino, Novell GroupWise, Alt-N Mdaemon, Zimbra, and others) on enterprise networks, and redirects emails and synchronizes contacts and calendaring information between servers, desktop workstations, and mobile devices.

Figure 3:
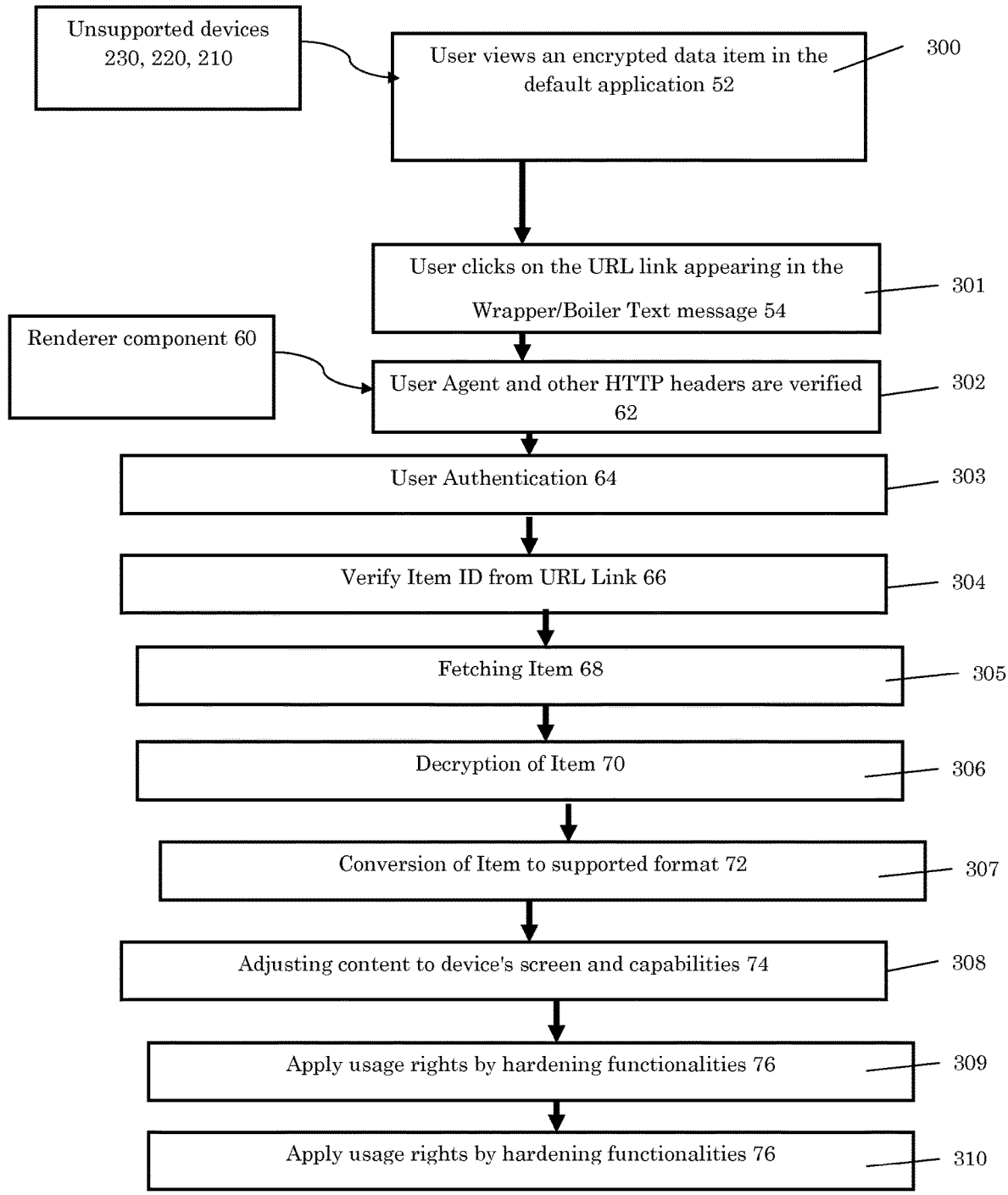
FIG. 3 is a flowchart illustrating a recipient accessing an encrypted item from unsupported devices, according to the method proposed by the present invention.

Referring now to FIG. 3, at the first step 300 an end user is able to see the wrapper text and URL 52 after a recipient accesses the data item from environments that do not support an encryption engine, such as unsupported devices 230, smartphones, 220, and tablets 210, as shown in FIG. 1. At the next step 301, the end user then clicks the link that was injected by the Modifier 30 (or any other method to operate the link). The link is directed to a Renderer Component 60 through HTTP/HTTPS network protocol. Optionally, the network protocol may be any reliable network protocol. The Renderer component 60 may be a Web Server, e.g. an Intranet/Internet site (a private or public Cloud service). At the next step 302 this component 60 is responsible to verify the user agent of the device 62 (in order to adjust the rendering capabilities tailored to the browser/device), authenticate the user 64 at step 303, verify the item's identifier 66 (from the GUID) at step 304, retrieve the item from the designated server 68 at step 305, decrypt the item 70 at step 306, convert the item to HTML 72 (or to a format which is capable of being consumed by a browser or by a web application client which are installed on the user's terminal device, or any format that can be read in the device like image formats, FLASH, HTML, Silverlight, and *.pdf) at step 307, add JavaScript to control IRM capabilities if needed 74 (copy/paste, print, add watermarks, applicative rights like reply/reply all, forward, edit, etc.) at step 308, and respond to the device with the rendered item. The end user then views the data item in its default browser. Optionally, the Renderer component may supply editorial capabilities to compose, edit, or amend email and document items.

Optionally, the Renderer component may supply applicative features such as email features (send, reply, reply all, and others), or any other applicative features that can be applied on the items.

The verification of the user agent is done by analyzing the HTTP header 62. In addition, other HTTP headers to identify screen resolution, operating system, and device may also be analyzed. Based on this data, it will reflect the way it will render and control the data within the calling browser. The authentication of the user 64 can be done through simple username and password like methods, such as Form Authentication or HTTP Basic Authentication. Alternatively, it can use Single Sign-On (SSO—a property of access control of multiple related, but independent software systems) capabilities that are used in devices such as Blackberry (using Blackberry MDS services) in which binding the blackberry identity to the Active Directory/Lightweight Directory Access Protocol (LDAP—an application protocol for accessing and maintaining distributed directory information services over an Internet Protocol network) user and allows delegation of the user to the Renderer component 150. Alternatively, it can use other technique of authentication like Strong Authentication, Two Factor Authentication, and others. The Renderer component 150 may latter use the credentials in order to locate the item within the data item storage server (MS Exchange, SharePoint, or others). The Renderer component 150, then, retrieves the GUID from the link 66. The GUID is used to locate the item within the data item storage server. For each data item storage server there may a different technique to locate the item. For email within MS Exchange, the use of a MAPI property may be used.

First, the mailbox of the authenticated user is located; this is done through the use of the email address of the authenticated user. The email is retrieved from the AD record of the user. Then through the use of Exchange Web Services SDK, the email item is found by searching the GUID from the MAPI property. It, then, transforms the URL to an Outlook Web App (OWA a webmail service of Microsoft Exchange Server 5.0 and later) URL to retrieve the item. Alternatively, if it is from ECM system like SharePoint, the use of searching within a custom property which is indexed by the search engine of SharePoint may be use.

When, the Modifier component 30 is inserting the GUID within the data item in a custom property, the indexer of SharePoint indexes those properties for a later search. Alternatively, the Render component 60 may request from a central DB based on a given GUID that contains a Lookup Table with the location of the item. Alternatively, if the system uses a dedicated item storage server 140, an item request based on the GUID will be sent to server to retrieve the correspondent item.

After locating the item, the Renderer component 60 is responsible to decrypt the item. The decryption process 70 may be done by using the credentials of the user in order to retrieve the key or the user license of the item. After the decryption process takes place, it then converts the item to HTML format in order to render it in a browser 72. The conversion may be based on a commercial text convention from MS WORD format to HTML format, MS PowerPoint format to HTML, MS Excel format to HTML, RTF format to HTML format, TXT format to HTML format or any other formats that may be supported. The HTML will be rendered in a way that will be adjusted to the device/browser 74. For example, by using viewport Meta tag, this may be used in order to adjust the right width and height in the device screen. In addition, if usage rights are applied on the item at step 309, hardening functionalities will be added to the item 76; for example, blocking from copying from the text. This may be accomplished by "layering" a transparent table on the top of the item so it will be impossible to copy from the underlined item text. Another example is force the browser not using its own caching mechanisms in order not leaving traces of sensitive data. This can be accomplished by adding special HTML headers like pragma:no-cache header field (an HTTP header for the browser to tell the server and any intermediate caches that it wants a fresh version of the resource, not for the server to tell the browser not to cache the resource). When the HTML is converted, at step 310 it is then sent to the requestor browser to be viewed by the user in a secure way 78. Alternatively, Exchange 2010 with Outlook Web (OWA) possesses for AD RMS decryption capabilities with rendering functionalities for data items such as email and attachments. In this scenario, upon locating the item, the Render component will construct a URL (a Uniform Resource Locator, also known as web address) that will access the particular item within OWA.

This can be accomplished through the use of a custom form in OWA or by the use of customizable OWA pages (such as asp.net pages, *.css files, and HTML pages) that will be adjusted to devices and browsers that are not standard to OWA. In addition, OWA is blocked to support services such as rendering encrypted items. To allow OWA to support those devices and browsers the use of Proxy maybe used in order to modify the user agent to a supported browser which is applicable to render encrypted items. The proxy can be used by techniques such as ISAPI filters (DLL files that can be used to filter every request until they find one they need to process) within (Internet Information Servers) IIS (IIS is a group of Internet servers with additional capabilities for Microsoft's Windows NT and Windows 2000 Server operating systems, resulting in faster Web page serving), HTTP modules, or other technique that may modify the user agent so OWA will allow rendering encrypted items. The Renderer component will redirect the browser with the given URL in order to render the item in OWA UI. In this scenario, the usage rights are supplied through the OWA interfaces with adjustment that might be needed for each browser and is accomplished through customization of OWA pages.

Although the methods and systems herein have been described with respect to an illustrative embodiment it should be appreciated that the methods and systems disclosed are independent of the precise architecture of the system, Item Encryption Verifier, Item Modifier, Item Renderer, data item storage server, Proxy, etc, used for processing data functions and capabilities may be distributed among various systems in a variety of ways and the principles of the invention are independent of the exact tasks by each system. Those components can be fully deployed as part of the system or can be distributed in other systems which will work in conjunction with components that are deployed by the system mentioned in the invention. For example, the Item Modifier can be integrated into an Enterprise Content Management (ECM) system (a formalized means of organizing and storing an organization's documents and other content that relate to the organization's processes) by a certain vendor, while the entire system can be deployed by another vendor.

Another advantage of the present invention is that employees often use different devices to access data and in some cases the same encrypted item can be accessed from one device while from different device you cannot. The majority of accesses are done from supported devices and minority are done from unsupported however those are also should be supported in order to endure employees and business productivity. If the digital environment is supported, the client application (that resides on the user's terminal device) natively consumes the data from the modified data item and is adapted to ignore its wrapper. Therefore, the solution proposed by the present invention generates the same modified data items for both supported and unsupported digital environments, regardless the type of terminal device. This allows accessing desired data items in a way which is already adapted both to supported and unsupported terminal devices.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A method for providing a plurality of terminal devices, which have varying decryption capabilities, access to a data item, the method comprising:
   intercepting the data item, which includes content;
   determining that the content of the data item is encrypted content but that an encapsulation wrapper of the data item is unencrypted, wherein the unencrypted encapsulation wrapper encapsulates the data item from view to anyone other than an intended recipient;
   in response to determining that the content of the data item is the encrypted content and irrespective of decryption capabilities of the plurality of terminal devices, modifying the unencrypted encapsulation wrapper of the data item by at least embedding (i) a uniform resource locator (URL) that has a unique identifier and (ii) an instruction message into the unencrypted encapsulation wrapper of the data item,
  wherein the modified unencrypted encapsulation wrapper is viewable by the plurality of terminal devices without requiring decryption, and
  wherein the instruction message includes at least an instruction for a user of a particular terminal device included among the plurality of terminal devices to navigate to the URL to view the encrypted content of the data item;
sending the data item with the modified unencrypted encapsulation wrapper toward the plurality of terminal devices;
in response to a first terminal device in the plurality of terminal devices attempting to display the data item with the modified unencrypted encapsulation wrapper, where the first terminal device has insufficient decryption capabilities:
  displaying the instruction message and URL on the first terminal device;
  identifying a web service used by the first terminal device, the web service being a selected service used to view data items;
  transforming the URL from a current version to a version that is usable by the web service to retrieve the data item; and
  using the transformed URL, which is now usable by the web service, to retrieve the data item;
in response to a second terminal device in the plurality of terminal devices attempting to display the data item with the modified unencrypted encapsulation wrapper, where the second terminal device has sufficient decryption capabilities, ignoring the URL, which has the unique identifier, and the instruction message, both of which are included within the modified unencrypted encapsulation wrapper of the data item, and decrypting and displaying the encrypted content of the data item on the second terminal device; and
after the encrypted content is decrypted such that decrypted content is available, determining that usage rights have been applied to the decrypted content to harden the decrypted content,
  wherein the usage rights include a header field that has been added to a browser, which is available to display the decrypted content, to force the browser to not leave any traces of the decrypted content, and
  wherein forcing the browser to not leave any traces of the decrypted content is performed as a result of the header field allowing only a fresh version of the decrypted content to be displayable.

2. The method according to claim 1, wherein the data item is intercepted by a server.

3. The method according to claim 1, wherein the data item is intercepted by a component that is integrated within an application.

4. The method according to claim 1, wherein a plurality of data items are intercepted at different locations and during different time spans.

5. The method according to claim 4, wherein:
a first encrypted data item is intercepted at a moment of its creation;
a second encrypted data item is intercepted at a moment of its transmission; and
a third encrypted data item is intercepted at a moment it is stored.

6. The method according to claim 1, wherein the intercepted data item is determined to be encrypted when its extension is one of predetermined extensions.

7. The method according to claim 1, wherein the intercepted data item is determined to be encrypted when it has a predetermined structure.

8. The method according to claim 1, wherein the intercepted data item is determined to be encrypted when its content is found to contain unique strings that are indicative of encrypted content.

9. The method according to claim 1, wherein a component for interception and modification of the data item is integrated with an application that is responsible to creation or delivery or storage of the data item.

10. The method according to claim 9, wherein the component is a proxy between (i) the application, which sends the data item to a server, and (ii) the server, which manages the data item.

11. The method according to claim 1, wherein modifying the unencrypted encapsulation wrapper is triggered by a batch process that scans data items located at different locations during predetermined time intervals, in order to identify encrypted data items.

12. The method according to claim 1, wherein modifying the unencrypted encapsulation wrapper is triggered by a predetermined event in a running application, to identify encrypted data items.

13. The method according to claim 1, wherein the unique ID is injected into an indexable property of a clear text section of the modified unencrypted encapsulation wrapper, to be used by a repository for retrieving the modified data item.

14. The method according to claim 13, wherein the indexable property is an email header.

15. The method according to claim 1, wherein the content of the data item is accessed after the user clicks on the URL link.

16. The method according to claim 1, wherein the data item is rendered to the terminal device, said rendering being done by accessing a renderer component.

17. The method according to claim 16, wherein the renderer component performs one or more of the following actions selected from a group of:
  analyzing a user agent, authenticating the user, obtaining an identifier associated with the data item, retrieving the data item, decrypting the data item, converting the data item to a standard rendering format, adjusting the rendering format to a screen requestor, hardening functionalities of the data item, and responding to the screen requestor.

18. The method according to claim 16, wherein the renderer component is a server.

19. The method according to claim 1, wherein the terminal device is a tablet or a smartphone.

20. The method according to claim 1, wherein a global unique identifier is transmitted to a central database and the modified data item is copied to a dedicated storage server.

21. The method according to claim 1, wherein the terminal device is a mobile communication device.

22. A system for providing a plurality of terminal devices, which have varying decryption capabilities, access to content of an encrypted data item, the system comprising:
  a plurality of terminal devices operable to receive and transmit data items over a network, each terminal device in the plurality of terminal devices having a browser or a web application client;

one or more software modules for performing the following steps before content of a particular data item is accessed by one of the plurality of terminal devices:

intercepting the particular data item containing the content;

determining that the content of the particular data item is encrypted but that an encapsulation wrapper of the particular data item is unencrypted, wherein the unencrypted encapsulation wrapper encapsulates the data item from view to anyone other than an intended recipient;

in response to determining that the content of the particular data item is encrypted and irrespective of decryption capabilities of the plurality of terminal devices, modifying the unencrypted encapsulation wrapper of the particular data item by at least embedding (i) a uniform resource locator (URL), which has a unique identifier, and (ii) an instruction message into the unencrypted encapsulation wrapper of the particular data item, wherein the modified unencrypted encapsulation wrapper of the particular data item is viewable by a particular terminal device of the plurality of terminal devices, without decryption, and wherein the instruction message includes at least an instruction for a user of the particular terminal device to navigate to the URL to view the encrypted content of the particular data item;

sending the particular data item with the modified unencrypted encapsulation wrapper toward the plurality of terminal devices;

in response to the particular terminal device of the plurality of terminal devices attempting to access the encrypted data item with the modified unencrypted encapsulation wrapper, where the particular terminal device has insufficient decryption capabilities:

displaying the instruction message and the URL on the first terminal device;

identifying a web service used by the first terminal device, the web service being a selected service used to view data items;

transforming the URL from a current version to a version that is usable by the web service to retrieve the data item; and using the transformed URL, which is now usable by the web service, to retrieve the data item;

in response to a different terminal device of the plurality of terminal devices attempting to display the particular data item with the modified unencrypted encapsulation wrapper, where the different terminal device has sufficient decryption capabilities, ignoring the modified unencrypted encapsulation wrapper, including the instruction message and the URL, and decrypting and displaying the content of the particular data item on the different terminal device; and after the encrypted content is decrypted such that decrypted content is available, determining that usage rights have been applied to the decrypted content to harden the decrypted content, wherein the usage rights include a header field that has been added to a browser, which is available to display the decrypted content, to force the browser to not leave any traces of the decrypted content, and wherein forcing the browser to not leave any traces of the decrypted content is performed as a result of the header field allowing only a fresh version of the decrypted content to be displayable.

* * * * *

UNITED STATES PATENT AND TRADEMARK OFFICE
CERTIFICATE OF CORRECTION

PATENT NO.       : 11,245,672 B2                                    Page 1 of 1
APPLICATION NO.  : 14/389527
DATED            : February 8, 2022
INVENTOR(S)      : Yuval Eldar It is certified that error appears in the above-identified patent and that said Letters Patent is hereby corrected as shown below:

On the Title Page

<u>In Item (73), Assignee</u>
Line 1, change "MICROSOFT TECHNOLOGLY LICENSING, LLC" to --MICROSOFT TECHNOLOGY LICENSING, LLC--

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*